INVENTOR.
HERMAN L. COPLEN JR.
BY
ATTORNEY

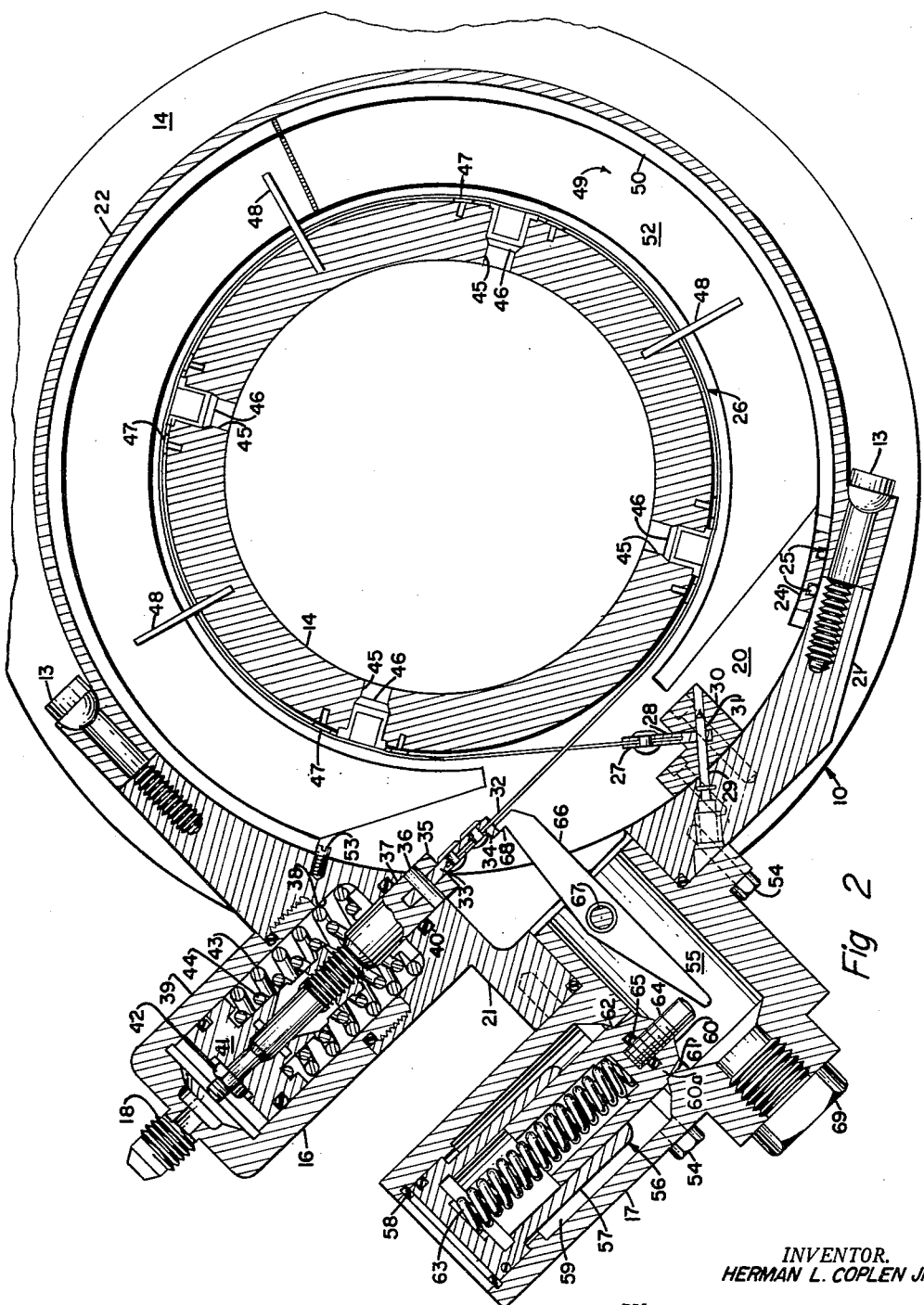

INVENTOR.
HERMAN L. COPLEN JR.

BY D. Gordon Angus
ATTORNEY

United States Patent Office
3,062,237
Patented Nov. 6, 1962

3,062,237
VALVE STRUCTURE
Herman L. Coplen, Jr., Sacramento, Calif., assignor to Aerojet-General Corporation, Azusa, Calif., a corporation of Ohio
Filed Dec. 19, 1957, Ser. No. 704,231
3 Claims. (Cl. 137—625.28)

This invention relates to control valves and specifically to the control valves of liquid fuel rocket motors although it is not necessarily restricted to that field.

In liquid fuel rocket motors the propellant when injected into a combustion chamber is required to develop a maximum thrust by the reaction of the energy developed by combustion during the very short time during which the motor can operate owing to limitation of the amount of propellant which can be carried, which requires that the flow of propellant should be burned under carefully controlled conditions. Valves to control the flow of propellant are therefore required to operate accurately at very high speed.

A further consideration is that when the valve is operated to shut off the flow of propellant no leakage should occur since accumulation of propellant under uncontrolled conditions may result in detonation instead of controlled combustion, and such explosions may damage or destroy the motor.

In consequence of the condition that leakage of propellant is hazardous and since the propellant is injected through small orifices into the combustion chamber and is necessarily led to such orifices by conduits, it is very important that a shut off valve should interrupt the flow of propellant as close to its point of injection as possible to reduce the amount of propellant downstream of the valve to a minimum since such residue will drain into the combustion chamber.

It is the general object of this invention to provide a valve construction for liquid fuel rocket engines which will operate satisfactorily under the conditions outlined.

It is an object of the invention to provide a valve construction which may be readily installed around the injector plate of a rocket engine or around the throat of the secondary combustion chamber of an engine having a primary and secondary chamber.

It is a further object of the invention to provide a valve construction provided with a resilient band element encircling a plurality of circularly arranged ports for the supply of propellant to a combustion chamber, the band being tightened or slacked back to control the flow of propellant through the ports.

Another object of the invention is to provide a band valve with mechanism to tighten or loosen it over a plurality of ports supplying propellant to a combustion chamber, and a valve controlling the supply of propellant to the space in which the band valve is arranged, the movement of the band valve and the supply valve being correlated.

With these and other objects which will later appear from the following specification read with reference to the accompanying illustrative drawings, the invention comprises a two part fitting which may be clamped around the head of a rocket motor to control the flow of propellant to the injector plate thereof, or around the throat between a primary and secondary combustion chamber to control the flow of additional fuel to the secondary chamber, the fitting comprising one part provided with operating means for a band valve of resilient material and a valve for supplying propellant to the fitting, and another part formed as a band the two parts being drawn up tightly on a cylindrical tubular part provided with a channel in its outer periphery through the bottom of which the propellant ports are formed and in which is positioned the resilient band overlying the ports. The operating means can tension the band to close the ports or can slacken the band to cause it to move away due to its resiliency from the ports to allow propellant supplied to the channel to flow therethrough. Preferably the tensioning or slackening movement of the band operating means is caused to control the valve admitting propellant radially inward to the channel.

In the drawings:

FIGURE 2 is a cross section on the line 2—2 of FIGURE 1.

Figure 1:
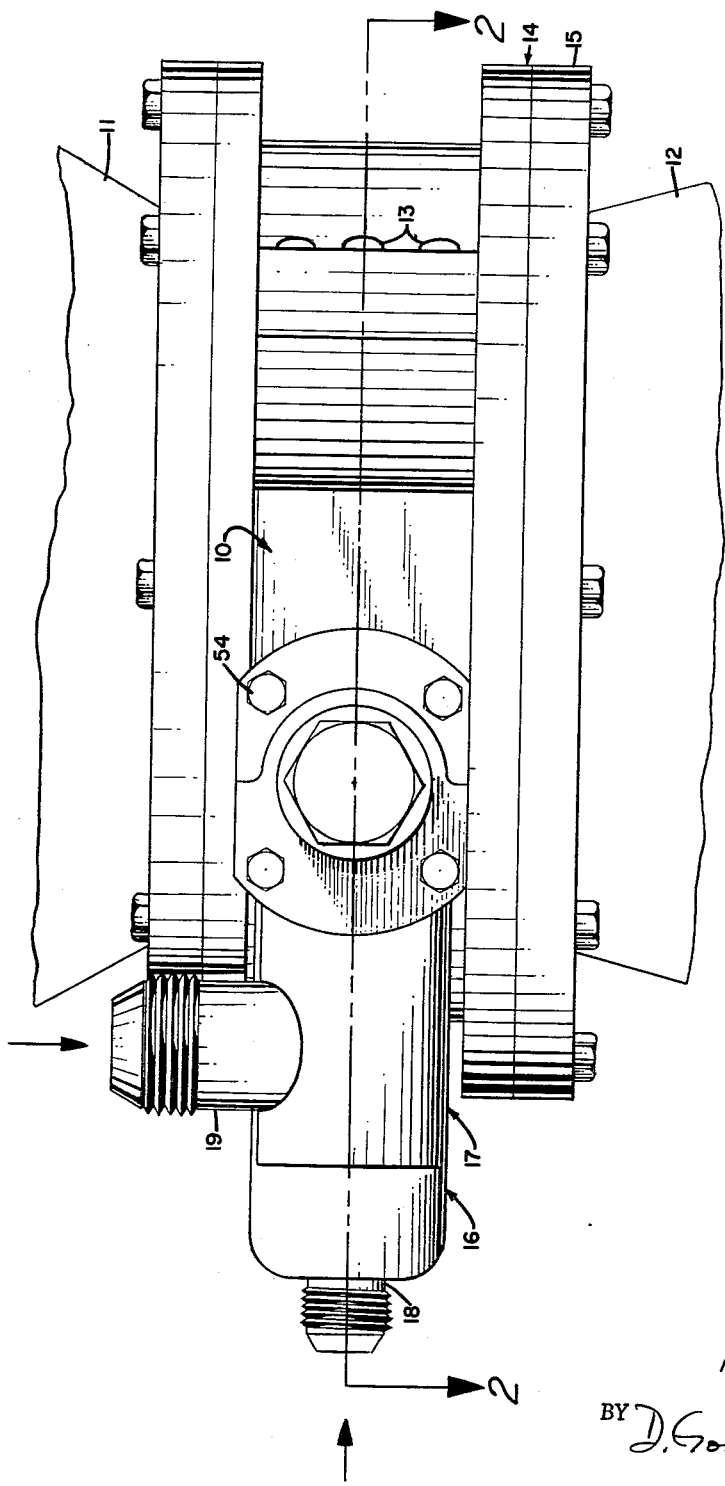
FIGURE 1 is an elevational view showing the valve arrangement mounted on the throat between primary and secondary chambers of a compound rocket engine.

Referring now to FIGURE 1 the numeral 10 indicates generally a fitting mounted between the primary combustion chamber 11 and a secondary chamber 12.

The fitting 10 is arranged in two parts and is clamped together in position by studs 13 onto a tubular member 14 furnished with a flange bolted to a flange 15 at the forward end of the secondary combustion chamber. Fitting 10 contains a band valve controlled by mechanism in a cylinder 16. The propellant is controlled by a valve in inlet valve housing 17, both cylinder 16 and valve housing 17 being mounted on one part of the fitting. Pressure fluid is admitted to cylinder 16 through pipe 18 and propellant is admitted to valve housing 17 through pipe 19.

In FIGURE 2 the member 14 is shown formed with a deep circumferential channel 20 which is closed by the fitting 10 and comprises a part 21 on which is mounted the cylinder 16, valve housing 17, and a semi-circular part 22 provided with thickened end portions drilled to receive the studs 13 which engage threaded holes in part 21.

Figure 3:
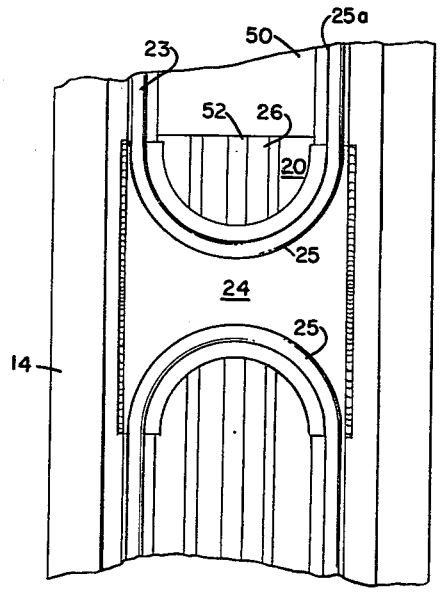
FIGURE 3 is a fragmentary detail view of a plate enabling an endless sealing member to be used.

A sealing member 23 (FIG. 3) is arranged between parts 21 and 22 of fitting 10 and the edges of the channel. Member 23 is formed as an endless loop formed for instance by cementing together the ends of a length of round section neoprene, the runs of which are carried across the channel by a plate 24 (FIG. 3) welded across the channel at a point where the parts 21, 22 of fitting 10 abut one another. Plate 24 is provided with curved grooves 25 which align at their outer ends with grooves 25a in which the sealing member 23 is located, and run along the edges of the channel 20. By the described sealing arrangement it is possible to install the sealing member and to assure the fluid tight closing of the channel since the abutting ends of parts 21 and 22 on the side opposite plate 24 may be drawn up tight against a piece of gasket material while the joint overlying plate 24 between the parts may be shimmed as required, and since the seal 23 lies on either side of the joint leakage is prevented.

The band valve 26 is formed from thin but stiff resilient material such as stainless steel and is shown in tightened condition in FIG. 2. The band 26 is anchored at one end 27 which is riveted in a saw cut in a small metal tab 28 which is drilled for the passage of a pin 29 having a threaded head screwed into a bore in the part 21 with the pin projecting into a drilled hole in a block 30 secured to part 21 and extending into channel 20. The projecting portion of the block 30 is slotted at 31 to receive tab 28, the slot intersecting the hole for the pin which thus is solidly supported at each side of the tab.

Figure 4:
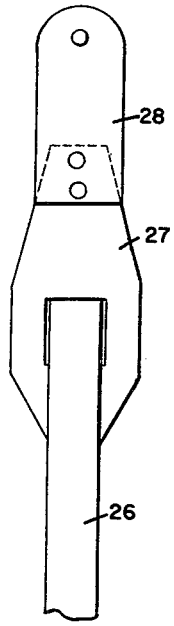
FIGURE 4 is a fragmentary view showing how the ends of the band utilized as a valve are arranged to secure engagement over nearly all its length with propellant admission ports.

The band valve 26 at its anchored end is widened and provided with a cutout as shown in FIG. 4 for the passage of the opposite end 32 of the band which is riveted in a slot in a plate 33 provided with a lip 34 at the end projecting into channel 20. The opposite end of the plate 33 is secured in a slot in the end of a piston rod 35 by a pin 36 which is a close fit in an axial bore 37 communicating with a recess 38 forming the inner end of a cylinder 39. An O ring seal 40 is positioned in a groove in the wall of the bore 37. A piston 41 is held on the piston rod 41a by a nut 42 and coil springs 43, 44, are positioned under compression between the inner end of the cylinder 39 and the underface of the piston.

In the position of the parts shown in FIG. 2 the springs 43, 44 are exerting a maximum tightening force on the resilient band valve to close ports 45 through the wall of member 14. The ports may be fitted with tubular plastic inserts 46 having outer edges raised slightly and exactly to the same extent above the bottom of the channel and machined to be in a common cylindrical surface. Preferably buttons 47 having heads machined to be in the same surface as the heads of the inserts 46 are positioned intermediate the ports to facilitate tight engagement of the band valve with the port openings.

Alignment of the band valve with the ports is assured by the provision of pins 48 inserted into the member 14 at each side of the band valve.

The tension on the valve band may be relaxed by the admission of pressure fluid to the cylinder 16 through pipe 18, this pressure fluid may be, for instance, provided by the propellant which is under a considerable pressure.

Figure 5:
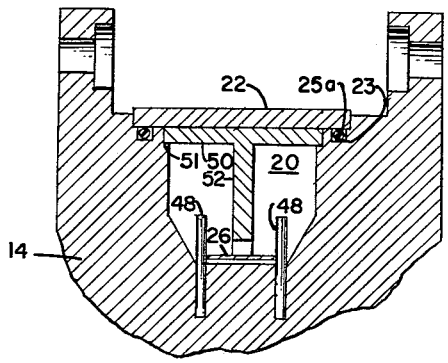
FIGURE 5 is a fragmentary section showing the arrangement of means closing the open side of a channel in which a band valve is arranged and insuring accurate operation of the valve.

The extent to which the band valve 26 may move away from the port openings due to its resiliency is limited by a stop member 49 having a flange member 50 (FIG. 5) seated along its edges in undercuts 51 running along the inner edges of the channel. The flange member 50 is provided with a centrally arranged inwardly extending web 52. Play of the stop member circumferentially of the fitting 10 may be limited by a stop pin 53 (FIG. 2) in one direction and by engagement of the opposite end of the flange 50 with plate 24.

In order to relate the flow of propellant to the degree of opening of the valve the flow of fuel through the inlet valve is controlled by a member in the housing 17 which member is controlled by the movable end of the band valve through lip 34.

The housing 17 is formed as a casting bolted in place on the part 21 of the fitting 10 by bolts 54 and is machined to provide a cylindrical valve housing and a passage 55 connecting the valve housing to the channel 20. The valve housing contains a hollow telescopic member 56 comprising an outer shell 57 of less outside diameter than the inside diameter of the housing providing an annular passage 59 fitted into the outer end of the housing and held therein by a ring 58. Propellant delivered through inlet pipe 19 flows through the annular space 59.

A tubular valve member 60 is mounted with a free sliding fit in shell 57.

The outer end or head of member 60 extends through an axial bore 51 at the inner end of the housing and is carefully machined to a conical shape increasing in diameter from the outer end to a shoulder 62 abutting against the inner edge of the bore 51 when the valve is closed.

A coiled spring 63 engages between the head 60a of the valve member 60 and the inner face of the base of the shell 57 and urges the valve toward closed position. An adjustable stem 64 is threaded into a threaded axial hole drilled in the head 60a and held in adjusted position by a nylon locking member 65.

The movement of the valve band operating member is transmitted to valve 60 through a lever 66 pivoted on a rod 67 mounted in opposite sides of the passage 55. One end of the lever 66 is provided with a lip 68 which abuts ear 34 on the plate by which the movable end of the band valve is connected to piston rod 35. The opposite end of the lever overlies and engages against the outer end of stem 64. The passage 55 is closed at its outer end by a drain and air bleed plug 69.

*Operation*

It is to be noted that while the band valve structure of this invention has been specifically described with relation to a valve controlling the flow of a monopropellant by a single band valve, a generally similar arrangement could be used for a bi-propellant motor using separate band valves for the fuel and oxidizer.

Further, while no specific disclosure has been made of means to dump propellant since it does not form a part of this invention, a construction utilizing a band valve to dump fuel from the channel in the fitting could be used. In actual practice when using the band valve described herein, use was made of a quick acting valve to dump the propellant.

Obviously means to purge the channel in which the band valve is arranged may be associated with the operating means for the band valve, if desired.

The resilient band valve is initially kept in closed condition by the tension exerted thereon by springs 43 and 44, and the inlet valve by the pressure of spring 63. To open the valve, pressurized fluid, which may be drawn from the propellant line but preferably from a separate source of pressure fluid such as a pressure bottle, is admitted through pipe 18 to the cylinder 39 and drives piston 41 forward against the resistance of springs 43 and 44. Piston rod 35 therefore moves forward reversing the force load on the band valve and due to its resiliency forcing the band off some of the ports which movement is transmitted around the band enabling it to move away from all the ports 45. The lip 34 on plate 33 causes lever 66 to transmit the movement of the piston rod to the inlet throttling valve which is opened to an extent corresponding to the movement of the actuator piston but the cross section of the inlet opening is varied in accordance with the contour of the valve plug given to the inlet end of the valve. It will be understood that the closing of the band valve is effected by relieving the pressure in cylinder 39 resulting in the closing of the ports 45 and fuel inlet valve 60.

A specific embodiment of the invention has been described and shown herein by way of illustration but not as limitative of the invention since various changes may be made therein by those skilled in the art without departing from the scope of the invention as defined by the appended claims.

I claim:

1. A valve structure for controlling the flow of fluid into a cylindrical part provided with a peripheral outwardly open channel therein for fluid having ports through the bottom of said channel for flow of fluid radially inward therethrough comprising: a resilient band located in said channel in position to control said ports; said band having a first position and a second position; a segmental structure mounted on said cylindrical part; tensioning means circumferentially pulling together the parts of said segmental structure to fit tightly against the whole circumference of said cylindrical part and covering said channel; means mounted on said structure for operating said band to close and open said ports to thereby control the admission of fluid to said channel; a spring biased inlet valve attached and in communication with said cylindrical part; and a lever means engaging said resilient band and in spaced relation with said spring biased inlet valve when the said band is in the first position; and the lever means being in engagement with the spring biased inlet valve when the said resilient band is in the second position.

2. A valve structure for controlling the flow of propellant into a combustion chamber of a fluid fuel rocket motor comprising: valve mounting structure adapted to be secured around the outer periphery of and between the ends of a cylindrical part through which propellant is injected and provided with a peripheral channel therein enclosed by said valve structure; said valve mounting structure having a flat bottom coaxial with said part and ports through said bottom through which propellant may flow radially inwardly through said ports into the cylindrical part; a resilient band located in said channel in position to obturate said ports; said resilient band having a first position and a second position; means mounted on said valve structure for tightening said band into the band's first position at times to close said ports and to loosen said band into the band's second position at other times to enable fluid to flow through said ports; a spring biased inlet regulator fixedly attached and in communication with said cylindrical part; and a lever member pivotally attached to said inlet regulator; said lever in contact with said resilient band and in spaced relation with said inlet regulator when said band is in the first position; and said lever in contact with said resilient band and said inlet regulator when said band is in the second position.

3. A valve structure for controlling the flow of fluid through a cylindrical part provided with an outwardly open peripheral channel therein having ports through the bottom wall of said channel comprising: a segmental member mounted on said cylindrical part; means for clamping the parts of the segmental members together in position to enclose said peripheral channel and to fit tightly against the whole circumference of the cylindrical member along the edges of said channel; a band valve of resilient material arranged in said channel in position to close and open said ports by radial inward and outward movement; said band valve having a first position and a second position; means mounted on said segmental member to effect radial inward and outward movement of the band valve; spring biased means for admitting fluid to said channel attached to said channel; and a movement transmitting means pivotally attached to said fluid admitting means in contact with said band valve and in spaced relation with said fluid admitting means when said band valve is in the first position; and said movement transmitting means being in contact with the band valve and the fluid admitting means when the band valve is in the second position.

References Cited in the file of this patent

UNITED STATES PATENTS

| | | |
|---|---|---|
| 809,400 | Schoonmaker | Jan. 9, 1906 |
| 1,601,737 | Johnson | Oct. 5, 1926 |
| 2,398,201 | Young et al. | Apr. 9, 1946 |
| 2,679,863 | Tucker | June 1, 1954 |
| 2,810,259 | Burdett | Oct. 22, 1957 |